United States Patent
Shin

(10) Patent No.: US 9,491,364 B2
(45) Date of Patent: Nov. 8, 2016

(54) CAMERA MODULE

(71) Applicant: LG INNOTEK CO., LTD., Seoul (KR)

(72) Inventor: Seung Taek Shin, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/055,833

(22) Filed: Feb. 29, 2016

(65) Prior Publication Data

US 2016/0182829 A1 Jun. 23, 2016

Related U.S. Application Data

(63) Continuation of application No. 14/411,893, filed as application No. PCT/KR2013/005776 on Jun. 28, 2013, now Pat. No. 9,277,108.

(30) Foreign Application Priority Data

Jun. 29, 2012 (KR) .................. 10-2012-0071203

(51) Int. Cl.
*H04N 5/232* (2006.01)
*H04N 5/225* (2006.01)

(52) U.S. Cl.
CPC ........ *H04N 5/23287* (2013.01); *H04N 5/2252* (2013.01); *H04N 5/2253* (2013.01); *H04N 5/2254* (2013.01)

(58) Field of Classification Search
CPC ........... H04N 5/2254; H04N 5/23287; H04N 5/2257; H04N 5/2253; G02B 13/0015; G02B 7/08; G03B 2205/0015; G03B 2205/0069; G03B 3/02; G03B 3/10; G03B 5/00
USPC .................................... 348/208.11
See application file for complete search history.

(56) References Cited

U.S. PATENT DOCUMENTS

| | | | | |
|---|---|---|---|---|
| 7,986,873 B2 * | 7/2011 | Ishihara | ............... | G02B 27/646 348/208.11 |
| 7,990,625 B2 | 8/2011 | Ke | | |
| 7,991,278 B2 * | 8/2011 | Chiang | ................. | G03B 17/00 348/208.11 |
| 8,238,734 B2 | 8/2012 | Chiang | | |
| 2010/0044679 A1 * | 2/2010 | Buh | ...................... | B82Y 10/00 257/24 |
| 2010/0080545 A1 * | 4/2010 | Fan | .......................... | G03B 5/02 396/55 |
| 2010/0098394 A1 * | 4/2010 | Ishihara | ............... | G02B 27/646 396/55 |
| 2010/0329654 A1 * | 12/2010 | Chiang | ................. | G03B 13/34 396/55 |

(Continued)

FOREIGN PATENT DOCUMENTS

| KR | 10-2010-0011188 A | 2/2010 |
|---|---|---|
| KR | 10-2010-0109331 A | 10/2010 |
| KR | 10-1069619 B1 | 10/2011 |

OTHER PUBLICATIONS

International Search Report dated Oct. 14, 2013 issued in Application No. PCT/KR2013/005776 (Full English Text).

(Continued)

*Primary Examiner* — Pritham Prabhakher
(74) *Attorney, Agent, or Firm* — KED & Associates LLP

(57) ABSTRACT

Disclosed is a camera module. The camera module according to one embodiment includes a lens barrel disposed in a housing to receive a lens; a driving unit moving the lens barrel relative to the housing; and a circuit board electrically connected to the driving unit. The driving unit includes a first driving unit in the lens barrel; and a second driving unit in the housing. A portion of the second driving unit directly makes contact with the circuit board.

23 Claims, 4 Drawing Sheets

(56) References Cited

U.S. PATENT DOCUMENTS

| | | | |
|---|---|---|---|
| 2011/0044679 A1* | 2/2011 | Yoshida | G02B 7/08 |
| | | | 396/133 |
| 2011/0096178 A1* | 4/2011 | Ryu | H04N 5/2252 |
| | | | 348/208.2 |
| 2011/0150441 A1 | 6/2011 | Ollila | |
| 2011/0150442 A1* | 6/2011 | Ollila | G03B 3/10 |
| | | | 396/55 |
| 2011/0157462 A1 | 6/2011 | Huang | |
| 2011/0236008 A1 | 9/2011 | Kang | |
| 2012/0002102 A1 | 1/2012 | Sekimoto | |
| 2012/0274800 A1 | 11/2012 | Vakil | |
| 2013/0089311 A1 | 4/2013 | Jung et al. | |
| 2013/0215511 A1* | 8/2013 | Wu | H04N 5/23287 |
| | | | 359/554 |

OTHER PUBLICATIONS

U.S. Notice of Allowance for parent U.S. Appl. No. 14/411,893 dated Oct. 20, 2015.

* cited by examiner

CAMERA MODULE

CROSS-REFERENCE TO RELATED PATENT APPLICATIONS

This application is a Continuation Application of U.S. patent application Ser. No. 14/411,893, filed Dec. 29, 2014, which is a U.S. National Stage Application under 35 U.S.C. §371 of PCT Application No. PCT/KR2013/005776, filed Jun. 28, 2013, which claims priority to Korean Patent Application No. 10-2012-0071203, filed Jun. 29, 2012, whose entire disclosures are hereby incorporated by reference.

TECHNICAL FIELD

The embodiment relates to a camera module.

BACKGROUND ART

Recently, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

Meanwhile, the camera module manufactured in these days is equipped with an image sensor module, which is manufactured through a COB (chip of board) scheme, a COF (chip of flexible) scheme or a CSP (chip scale package) scheme, and is usually connected to a main substrate through an electric connection unit, such as a PCB (printed circuit board) or an FPCB (flexible printed circuit board).

However, users recently request the camera module, which can be directly mounted on the main substrate similar to a general passive element, in such a manner that the manufacturing process for the camera module can be simplified while reducing the manufacturing cost.

The camera module is generally manufactured by attaching an image sensor, such as a CCD or a CMOS, to a substrate through a wire bonding scheme or a flip chip scheme. An image of a subject is focused by the image sensor and the focused image is stored as data in a memory, which is installed inside or outside the camera module. In addition, the stored data are converted into electric signals and the electric signals are displayed as images through a display medium, such as an LCD or a PC monitor provided in a device.

A camera module according to the related art includes a housing, an image sensor supported on a bottom of the housing to convert an image signal received through a lens into an electric signal, a lens group to focus an image signal of a subject to the image sensor, and a barrel in which the lens group are stacked. The housing, the lens group and the barrel are sequentially coupled with each other.

In addition, an FPCB mounted thereon with chip components, which are electric components serving as a condenser and a resistor to drive the image sensor including a CCD or a CMOS, is electrically connected to the bottom of the housing.

In the camera module having the above structure according to the related art, in a state that a plurality of circuit components have been mounted on the FPCB, an ACF (anisotropic conductive film) is inserted between the substrate and the image sensor, and heat and pressure are applied thereto in such a manner that the substrate, the image sensor and the ACF are fixedly bonded and conducted with each other and an IR cut-off filter is attached to an opposite side.

In addition, in a state that the barrel provided therein with a plurality of lens groups is temporally screw-coupled with the housing, as described above, the assembled PCB used for mounting devices is fixedly bonded to the bottom of the housing by an adhesive.

Meanwhile, after the PCB, to which the image sensor is attached, has been fixedly bonded to the housing coupled with the barrel, a focus adjustment is carried out with respect to a subject (resolution chart) located in front of the barrel and spaced apart from the barrel by a predetermined distance. At this time, the focus adjustment of the camera module can be achieved between the lens group and the image sensor while adjusting the vertical displacement by rotating the barrel screw-coupled with the housing.

DISCLOSURE OF INVENTION

Technical Problem

The embodiment provides a camera module capable of effectively preventing hand-shaking.

Solution to Problem

According to the embodiment, there is provided a camera module including a lens barrel disposed in a housing to receive a lens; a driving unit moving the lens barrel relative to the housing; and a circuit board electrically connected to the driving unit, wherein the driving unit comprises: a first driving unit in the lens barrel; and a second driving unit in the housing, and wherein a portion of the second driving unit directly makes contact with the circuit board.

Advantageous Effects of Invention

The camera module according to the embodiment can compensate for hand-shaking by driving the lens barrel with respect to the housing. That is, the driving unit can compensate for hand-shaking by moving the lens barrel relative to the housing.

In particular, the camera module according to the embodiment moves the lens barrel by applying magnetic force in the direction inclined with respect to the reference horizontal plane. Thus, the camera module according to the embodiment can move the lens barrel in the 3-axis directions. Therefore, the camera module according to the embodiment can compensate for the shaking in the left and right directions and can adjust the focus.

Meanwhile, the driving unit of the camera module according to the embodiment includes the coil which directly makes contact with the circuit board. Thus, the coil can be connected to the circuit board without using a spring or a pin so that the structure and the manufacturing process can be simplified. In addition, the defective rate can be reduced by reducing the number of soldering processes.

MODE FOR THE INVENTION

Figure 1:
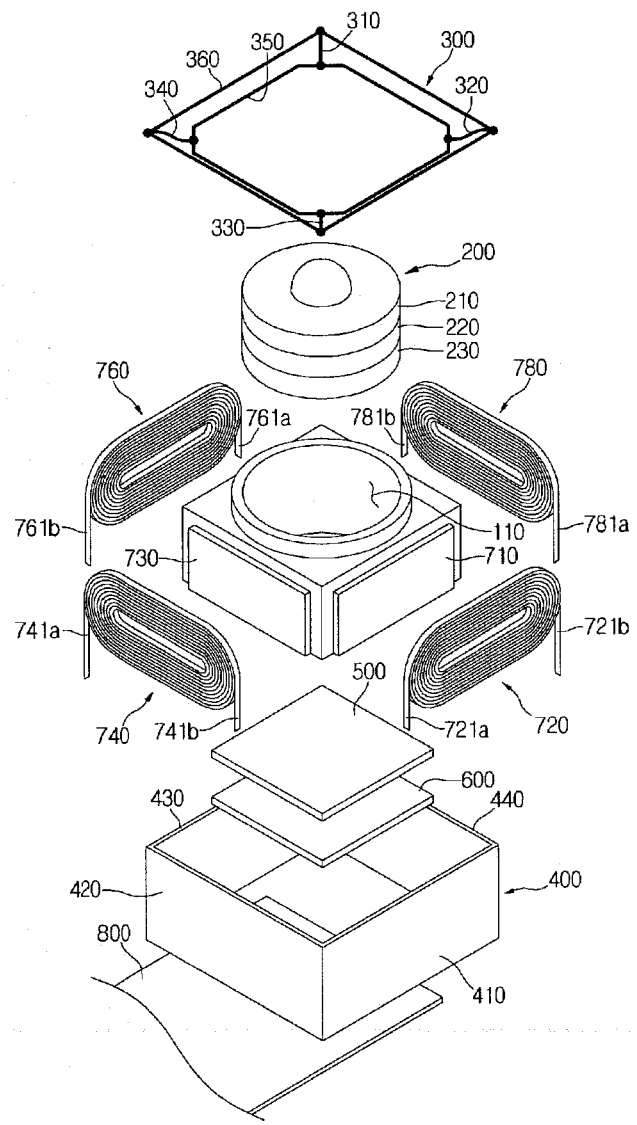
FIG. 1 is an exploded perspective view showing a camera module according to the embodiment.

In the description of the embodiments, it will be understood that when each lens, unit, part, hole, protrusion, groove or layer is referred to as being "on" or "under" another lens, unit, part, hole, protrusion, groove or layer, it can be "directly" or "indirectly" on the other lens, unit, part, hole, protrusion, groove or layer or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
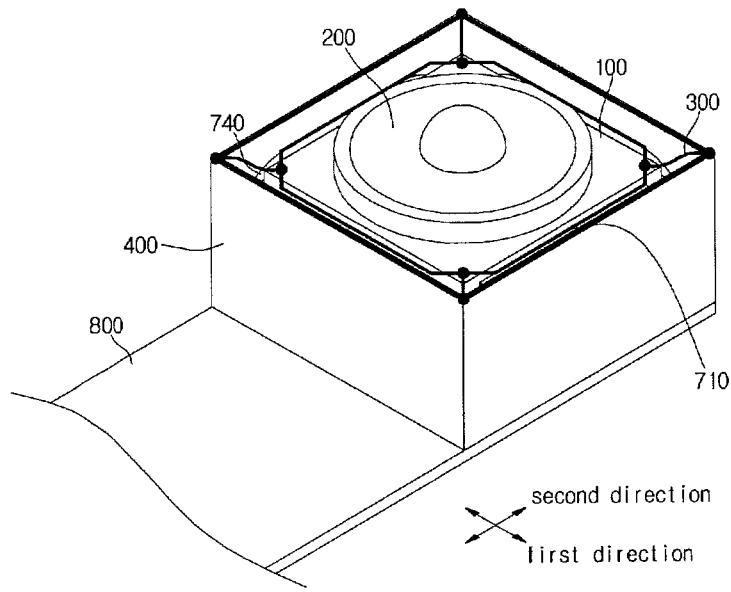
FIG. 2 is a perspective view showing a camera module according to the embodiment.
Figure 3:
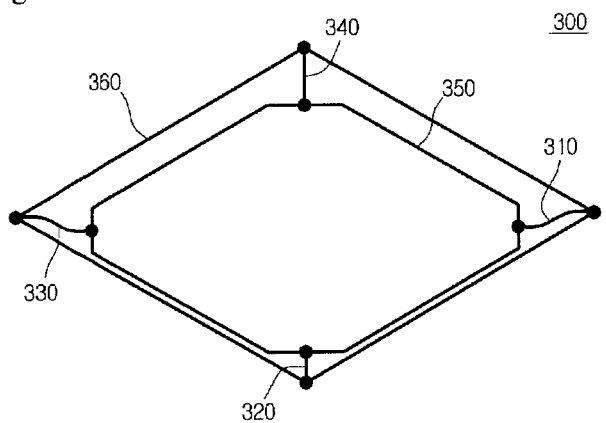
FIG. 3 is a view showing an elastic member.
Figure 4:
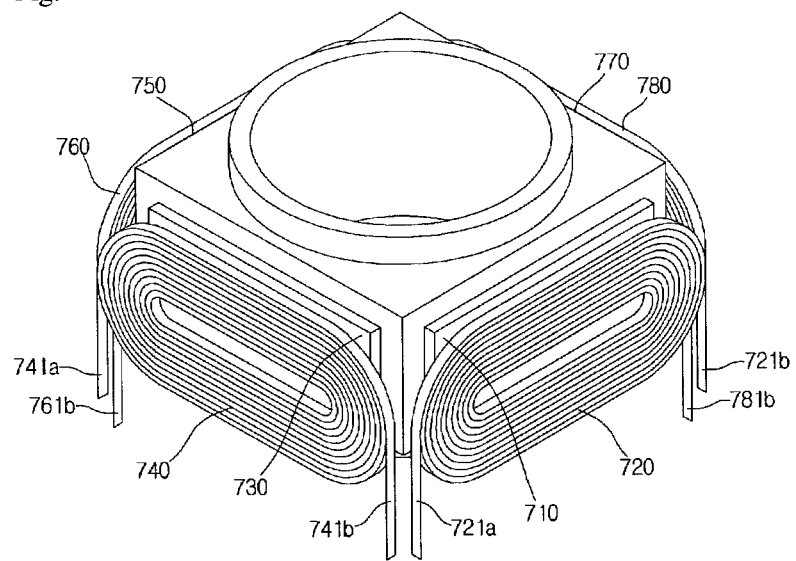
FIG. 4 is a perspective view showing a lens barrel and a driving unit.
Figure 5:
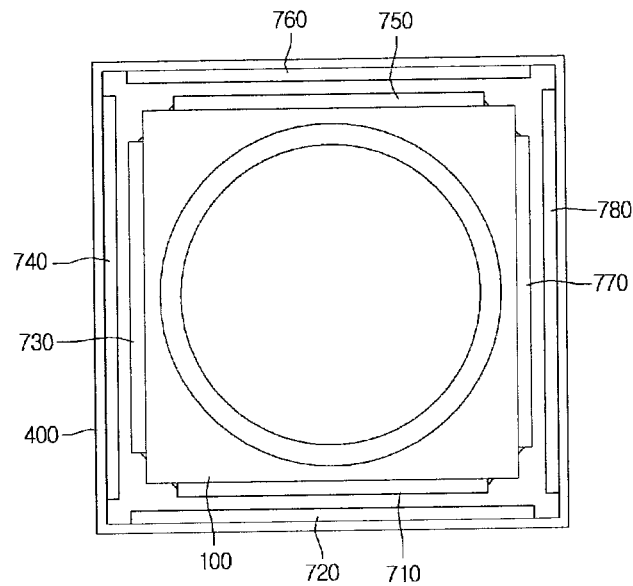
FIG. 5 is a cross sectional view of a camera module according to the embodiment.
Figure 6:
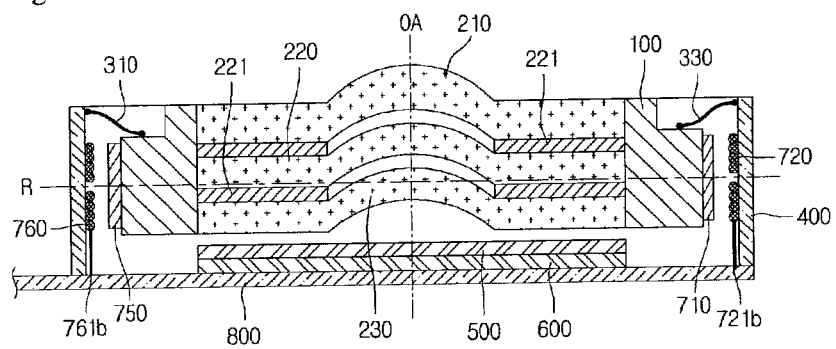
FIG. 6 is a longitudinal sectional view of a camera module according to the embodiment.
Figure 7:
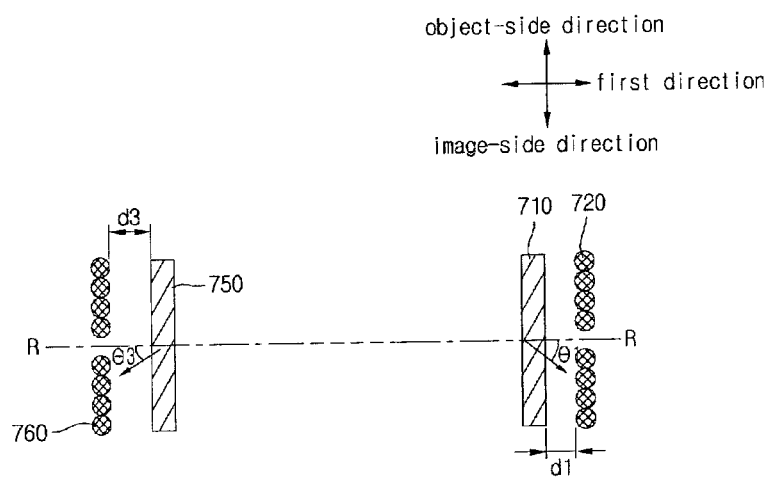
FIG. 7 is a view showing a portion of the driving unit.
Figure 8:
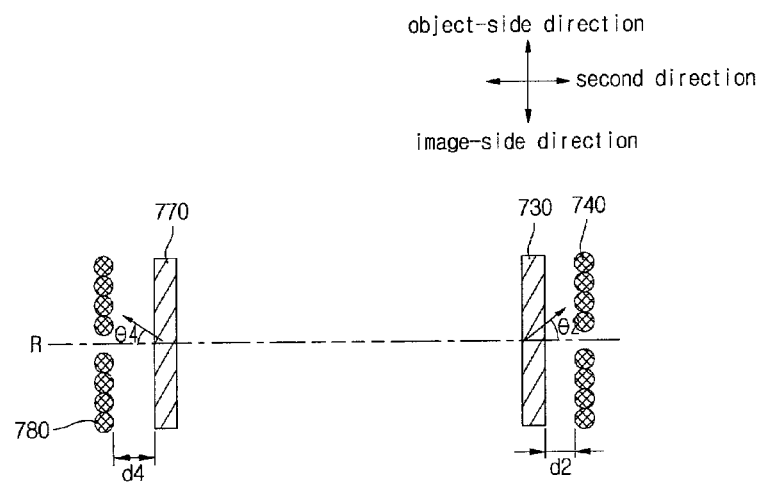
FIG. 8 is a view showing another portion of the driving unit.

FIG. 1 is an exploded perspective view showing a camera module according to the embodiment, FIG. 2 is a perspective view showing the camera module according to the embodiment, FIG. 3 is a view showing an elastic member, FIG. 4 is a perspective view showing a lens barrel and a driving unit, FIG. 5 is a cross sectional view of the camera module according to the embodiment, FIG. 6 is a longitudinal sectional view of the camera module according to the embodiment, FIG. 7 is a view showing a portion of the driving unit and FIG. 8 is a view showing another portion of the driving unit.

Referring to FIGS. 1 to 8, the camera module according to the embodiment includes a lens barrel 100, a lens assembly 200, an elastic member 300, a housing 400, an IR cut-off filter unit 500, a sensor unit 600, a circuit board 700 and driving units 710, 720 . . . and 700N.

The lens barrel 100 receives the lens assembly 200 therein.

The lens barrel 100 has a receiving groove 110 for receiving the lens assembly 200. The receiving groove 110 may have a shape corresponding to a shape of the lens assembly 200. When viewed from the bottom, the receiving groove 110 may have a circular shape. In detail, when viewed from the bottom, the receiving groove 110 may have a circular shape. That is, the outer portion of the receiving groove 110 may have a circular shape. In addition, the outer portion of the receiving groove 110 may have a rectangular shape.

The lens barrel 100 may have a rectangular shape. That is, the outer portion of the lens barrel 100 may have a rectangular shape.

The lens barrel 100 may be connected with the housing 400. In detail, the lens barrel 100 is connected to the housing 400 through the elastic member 300. That is, the lens barrel 100 may be movably connected to the housing 400 by the elastic member 300.

In addition, the lens barrel 100 includes a light incident groove, which is open upward (toward an object). The light incident groove exposes the lens assembly 200. An image is incident into the lens assembly 200 through the light incident groove.

The lens assembly 200 is disposed in the lens barrel 100. In detail, the lens assembly 200 is disposed in the receiving groove 110. The lens assembly 200 is inserted into the receiving groove 110. The lens assembly 200 may have a first outer profile. In detail, the lens assembly 200 may have a circular outer profile. In more detail, the lens assembly may have a circular shape when viewed from the top. In addition, the lens assembly 200 may have a rectangular shape when viewed from the top.

The lens assembly 200 includes a plurality of lenses 210, 220 and 230. For instance, the lens assembly 200 may include a first lens 210, a second lens 220, and a third lens 230. The third lens 230, the second lens 220, and the first lens 210 may be sequentially laminated.

Further, a first spacer 221 and a second spacer 222 may be interposed among the lenses 210, 220, 230, and 240. The lenses 210, 220, 230, and 240 are spaced apart from each other through the first spacer 221 and the second spacer 222.

Although it has been described that the lens assembly 200 includes three lenses, the embodiment is not limited thereto. That is, the lens assembly 200 may include one or two lenses or at least four lenses.

The elastic member 300 is disposed in the housing 400. The elastic member 300 is fixed to the housing 400. Further, the elastic member 300 is fixed to the lens barrel 100. The elastic member 300 movably fixes the lens barrel 100 to the housing 400.

The elastic member 300 may include a spring. In detail, the elastic member 300 may include a leaf spring. The elastic member 300 may include four elastic sections 310, 320, 330 and 340. For instance, the elastic member 300 may include a first elastic section 310, a second elastic section 320, a third elastic section 330 and a fourth elastic section 340.

One end of the first elastic section 310 is fixed to the lens barrel 100 and the other end of the first elastic section 310 is fixed to the housing 400.

In addition, one end of the second elastic section 320 is fixed to the lens barrel 100 and the other end of the second elastic section 320 is fixed to the housing 400.

Further, one end of the third elastic section 330 is fixed to the lens barrel 100 and the other end of the third elastic section 330 is fixed to the housing 400.

In addition, one end of the fourth elastic section 340 is fixed to the lens barrel 100 and the other end of the fourth elastic section 340 is fixed to the housing 400.

The elastic member 300 may further include a first fixing link 350 and a second fixing link 360.

The first fixing link 350 surrounds the outer peripheral portion of the receiving groove 110 of the lens barrel 100. The first fixing link 350 is connected to one end of the first elastic section 310, one end of the second elastic section 330, one end of the third elastic section 330 and one end of the fourth elastic section 340.

The first fixing link 350 may be fixed to the lens barrel 100. In addition, the first fixing link 350 may fix the position of the first to fourth elastic sections 310 to 340.

The second fixing link 360 is disposed along sidewalls 410, 420, 430 and 440 of the housing 400. The second fixing link 360 is connected to the other end of the first elastic section 310, the other end of the second elastic section 330, the other end of the third elastic section 330 and the other end of the fourth elastic section 340.

The second fixing link 360 may be fixed to the housing 400. In addition, the second fixing link 360 may fix the position of the first to fourth elastic sections 310 to 340.

The housing 400 receives the lens barrel 100, the sensor unit 600 and the IR cut-off filter unit 500. The housing 400 is connected to the lens barrel 100 through the elastic member 300.

The housing 400 may include plastic or metal. The housing 400 may have a rectangular container shape. For instance, the housing 400 may include four sidewalls 410, 420, 430 and 440. The sidewalls 410, 420, 430 and 440 may surround the lens barrel 100.

The sidewalls 410, 420, 430 and 440 may be integrally formed with each other. The sidewalls 410, 420, 430 and 440 may face the outer surfaces of the lens barrel 100, respectively. The sidewalls 410, 420, 430 and 440 may include a first sidewall 410, a second sidewall 420, a third sidewall 430 and a fourth sidewall 440.

Although not shown in the drawings, a cover section may be further provided. The cover section extends from the sidewalls 410, 420, 430 and 440 to cover the lens barrel 100. The cover section may include an opening area to partially expose the lenses 210, 220 and 230.

The housing 400 is fixed to the circuit board 800. The housing 400 may be coupled with the circuit board 800.

The IR cut-off filter unit 500 is disposed in the housing 400. The IR cut-off filter unit 500 is fixed to the circuit board 800 and may be fixed to the housing 400. The IR cut-off filter unit 500 filters an incident IR. The IR cut-off filter unit 500 may filter light having an excessively long wavelength introduced into the sensor unit 600.

The IR cut-off filter unit 500 may be formed by alternately depositing titanium oxide and silicon oxide on optical glass. In order to cut-off the IR, thicknesses of the titanium oxide and the silicon oxide may be suitable adjusted.

The sensor unit 600 is received in the housing 400. The sensor unit 600 includes a CCD image sensor and a CMOS image sensor. In addition, the sensor unit 600 further includes the circuit board 800 connected to the image sensor. The sensor unit 600 converts an incident image into an electrical signal.

The sensor unit 600 is fixed to the circuit board 800. The sensor unit 600 may be mounted on the circuit board 800. The sensor unit 600 is electrically connected to the circuit board 800.

The circuit board 800 may cover a bottom of the housing 400. The circuit board 800 is coupled with the housing 400. The circuit board 800 may include a printed circuit board (PCB). The circuit board 800 may be electrically connected to the sensor unit 600. The circuit board 800 may apply a signal for driving the sensor unit 600. Further, the circuit board 800 may receive a signal from the sensor unit 600.

The sensor unit 600 is mounted on the circuit board 800. In detail, the sensor unit 600 may be fixed to the circuit board 800. That is, the sensor unit 600 may be fixed to the housing 400 through the circuit board 800.

Further, the circuit board 800 may be electrically connected to the driving units 710, 720 . . . and 700N. That is, a signal for driving the driving units 710, 720 . . . and 700N may be applied to the driving units 710, 720 . . . 700N through the circuit board 800. Some of the driving units 710, 720 . . . 700N may directly make contact with the circuit board 800, which will be described later.

The driving units 710, 720 . . . and 700N drive the lens barrel 100 with respect to the housing 400. The driving units 710, 720 . . . and 700N drive the lens barrel 100 relative to the housing 400. In more detail, the driving units 710, 720 . . . and 700N may drive the lens barrel 100 in 3-axis directions relative to the housing 400.

The driving units 710, 720 . . . and 700N may move the lens barrel 100 relative to the housing 400 by magnetic force. At this time, the magnetic force is applied in the direction inclined with respect to the optical axis OA of the lens assembly 200.

The driving units 710, 720 . . . and 700N may include a first driving unit 710, a second driving unit 720, a third driving unit 730, a fourth driving unit 740, a fifth driving unit 750, a sixth driving unit 760, a seventh driving unit 770, and an eighth driving unit 780.

A reference horizontal plane R, which is perpendicular to the optical axis OA of the lens assembly 200, may be defined. The reference horizontal plane R may pass through the center of the first driving unit 710. The reference horizontal plane R may divide the first driving unit 710 into two half parts.

In addition, an object-side direction may be defined toward the object of the lens assembly 200 in the optical axis OA direction, that is, an upward direction in the drawing. In addition, an image-side direction may be defined toward the sensor unit 600 directed to the image of the lens assembly 200 in the optical axis OA direction, that is, the downward direction in the drawing.

In addition, the first direction may be defined in the direction perpendicular to the optical axis OA as well as the first and fifth driving units 710 and 750. Further, the second direction may be defined in the direction perpendicular to the optical axis OA as well as the third and seventh driving units 730 and 770.

The first direction may be perpendicular to the second direction.

In addition, the object-side direction is defined with a positive angle and the upper direction is defined with a negative angle about the reference horizontal plane R. That is, if the directional vector is biased to the object-side direction about the reference horizontal plane R, it is defined with the positive angle. Further, if the directional vector is biased to the image-side direction about the reference horizontal plane R, it is defined with the negative angle.

The first driving unit 710 is fixed to the lens barrel 100. In detail, the first driving unit 710 is fixed to the outer portion of the lens barrel 100. In more detail, the first driving unit 710 may be attached to the outer surface of the lens barrel 100. The first driving unit 710 may be attached to the center of one outer surface of the lens barrel 100.

The first driving unit 710 may include a magnetic material. The first driving unit 710 may be formed by the magnetic material. The first driving unit 710 may include iron oxide, CoFe2O4 or ferrite. The first driving unit 710 may have a plate shape. The first driving unit 710 may have a rectangular plate shape.

The magnetization direction of the first driving unit 710 may be inclined with respect to the optical axis OA. In addition, the magnetization direction of the first driving unit 710 may be inclined with respect to the first direction. Further, the magnetization direction of the first driving unit 710 may be inclined with respect to the reference horizontal plane R. In detail, the magnetization direction of the first driving unit 710 may be set between the first direction and the image-side direction. That is, the magnetization direction of the first driving unit 710 may be located in a plane defined by the first direction and the image-side direction.

An angle θ1 between the magnetization direction of the first driving unit 710 and the reference horizontal plane R is in the range of about −20° to about −70°. In detail, the angle θ1 between the magnetization direction of the first driving unit 710 and the reference horizontal plane R is in the range of about −30° to about −50°.

The second driving unit 720 is fixed to the housing 400. In detail, the second driving unit 720 may be disposed inside the housing 400. In addition, the second driving unit 720 may be disposed at an outer surface of the housing 400. The second driving unit 720 may be disposed at the first sidewall 410.

The second driving unit 720 faces the first driving unit 710. In addition, the first and second driving units 710 and 720 are spaced apart from each other while facing each other. The second driving unit 720 may be parallel to the first driving unit 710. A distance d1 between the first and second driving units 710 and 720 is in the range of about 50 μm to about 1000 μm, in detail, about 100 μm to about 500 μm.

The second driving unit 720 may include a coil. That is, the second driving unit 720 may be prepared in the form of a coil. In this case, the coil of the second driving unit 720 is wound about an axis extending in the first direction.

The coil of the second driving unit 720 may be electrically connected to the circuit board 800. A portion of the second driving unit 720 may directly make contact with the circuit board 800.

In detail, the second driving unit 720 includes extension parts 721a and 721b. The extension parts 721a and 721b extend from both ends of the second driving unit 720, respectively. That is the extension parts 721a and 721b are drawn from the coil of the second driving unit 720. The extension parts 721a and 721b may be drawn from an outer portion of the coil of the second driving unit 720. Although the extension parts 721a and 721b are illustrated as to be drawn from the outer portion of the coil, the embodiment is not limited thereto. That is, the extension parts 721a and 721b may be drawn from an inner portion of the coil of the second driving unit 720. However, if the extension parts 721a and 721b are drawn from the inner portion of the coil of the second driving unit 720, the extension parts 721a and 721b may interfere with components so the drawing work is difficult.

End portions of the extension parts 721a and 721b may directly make contact with the circuit board 800. The extension parts 721a and 721b may extend from the second driving unit 720 to the top surface of the circuit board 800. Since end portions of the extension parts 721a and 721b directly make contact with the circuit board 800, the coil can be connected to the circuit board 800 without using a spring or a pin so that the structure and the manufacturing process can be simplified. In addition, the defective rate can be reduced by reducing the number of soldering processes.

Although it has been described above that the first driving unit 710 includes the magnetic material, which is magnetized in the inclined direction, and the second driving unit 720 includes the coil, the embodiment is not limited thereto. For instance, the second driving unit 720 may include the magnetic material, which is magnetized in the inclined direction, and the first driving unit 710 may include the coil.

Attractive force or repulsive force may be generated between the first and second driving units 710 and 720. The second driving unit 720 may apply the attractive force or repulsive force to the first driving unit 710. Since the attractive force or repulsive force has the relative concept, the application of the attractive force or repulsive force from the second driving unit 720 to the first driving unit 710 is substantially identical to the application of the attractive force or repulsive force from the first driving unit 710 to the second driving unit 720.

The second driving unit 720 may apply attractive force or repulsive force to the first driving unit 710 in a direction inclined with respect to the reference horizontal plane R. In this case, the second driving unit 720 may apply the magnetic force to the first driving unit 710 at an angle of about +20° to about +70° with respect to the reference horizontal plane R. In detail, the second driving unit 720 may apply the magnetic force to the first driving unit 710 at an angle of about +30° to about +50° with respect to the reference horizontal plane R.

In addition, the second driving unit 720 may apply the magnetic force to the first driving unit 710 in the first direction as well as the object-side direction. That is, the second driving unit 720 may apply the magnetic force to the first driving unit 710 in the lateral upward direction.

The third driving unit 730 is fixed to the lens barrel 100. In detail, the third driving unit 730 is fixed to the other outer portion of the lens barrel 100. In more detail, the third driving unit 730 is attached to the other outer surface of the lens barrel 100. The third driving unit 730 may be attached to the center of the other outer surface of the lens barrel 100.

The third driving unit 730 includes a magnetic material. The third driving unit 730 may be formed by using the magnetic material. The third driving unit 730 may include iron oxide, $CoFe_2O_4$ or ferrite. The third driving unit 730 may have a plate shape. The third driving unit 730 may have a rectangular plate shape.

The magnetization direction of the third driving unit 730 may be inclined with respect to the optical axis OA. In addition, the magnetization direction of the third driving unit 730 may be inclined with respect to the second direction. Further, the magnetization direction of the third driving unit 730 may be inclined with respect to the reference horizontal plane R. In detail, the magnetization direction of the third driving unit 730 may be set between the second direction and the object-side direction. That is, the magnetization direction of the third driving unit 730 may be located in a plane defined by the second direction and the object-side direction.

An angle θ2 between the magnetization direction of the third driving unit 730 and the reference horizontal plane R is in the range of about +20° to about +70°. In detail, the angle θ2 between the magnetization direction of the third driving unit 730 and the reference horizontal plane R is in the range of about +30° to about +50°.

The fourth driving unit 740 is fixed to the housing 400. In detail, the fourth driving unit 740 may be disposed at the other inner side of the housing 400. In addition, the fourth driving unit 740 may be disposed at the other outer surface of the housing 400. The fourth driving unit 740 may be disposed at the second sidewall 420.

The fourth driving unit 740 faces the third driving unit 730. In addition, the third and fourth driving units 730 and 740 are spaced apart from each other while facing each other. The fourth driving unit 740 may be parallel to the third driving unit 730. A distance d2 between the third and fourth driving units 730 and 740 is in the range of about 50 μm to about 1000 μm, in detail, about 100 μm to about 500 μm.

The fourth driving unit 740 may include a coil. That is, the fourth driving unit 740 may be prepared in the form of a coil. In this case, the coil of the fourth driving unit 740 is wound about an axis extending in the second direction.

The coil of the fourth driving unit 740 may be electrically connected to the circuit board 800. A portion of the fourth driving unit 740 may directly make contact with the circuit board 800.

In detail, the fourth driving unit 740 includes extension parts 741a and 741b. The extension parts 741a and 741b extend from both ends of the fourth driving unit 740, respectively. That is the extension parts 741a and 741b are drawn from the coil of the fourth driving unit 740. The extension parts 741a and 741b may be drawn from an outer portion of the coil of the fourth driving unit 740. Although the extension parts 741a and 741b are illustrated as to be drawn from the outer portion of the coil, the embodiment is not limited thereto. That is, the extension parts 741a and 741b may be drawn from an inner portion of the coil of the fourth driving unit 740. However, if the extension parts 741a and 741b are drawn from the inner portion of the coil of the fourth driving unit 740, the extension parts 741a and 741b may interfere with components so the drawing work is difficult.

End portions of the extension parts 741a and 741b may directly make contact with the circuit board 800. The extension parts 741a and 741b may extend from the fourth driving unit 740 to the top surface of the circuit board 800. Since end portions of the extension parts 741a and 741b directly make contact with the circuit board 800, the structure and the manufacturing process can be simplified. In addition, the defective rate can be reduced by reducing the number of soldering processes.

Although it has been described above that the third driving unit 730 includes the magnetic material, which is magnetized in the inclined direction, and the fourth driving unit 740 includes the coil, the embodiment is not limited thereto. For instance, the fourth driving unit 740 may include the magnetic material, which is magnetized in the inclined direction, and the third driving unit 730 may include the coil.

Attractive force or repulsive force may be generated between the third and fourth driving units 730 and 740. The fourth driving unit 740 may apply the attractive force or repulsive force to the third driving unit 730.

The fourth driving unit 740 may apply attractive force or repulsive force to the third driving unit 730 in a direction inclined with respect to the reference horizontal plane R. In this case, the fourth driving unit 740 may apply the magnetic force to the third driving unit 730 at an angle of about −20° to about −70° with respect to the reference horizontal plane R. In detail, the fourth driving unit 740 may apply the magnetic force to the third driving unit 730 at an angle of about −30° to about −50° with respect to the reference horizontal plane R.

In addition, the fourth driving unit 740 may apply the magnetic force to the third driving unit 730 in the second direction as well as the image-side direction. That is, the fourth driving unit 720 may apply the magnetic force to the third driving unit 730 in the lateral downward direction.

The fifth driving unit 750 is fixed to the lens barrel 100. In detail, the fifth driving unit 750 is fixed to the other outer portion of the lens barrel 100. In more detail, the fifth driving unit 750 is attached to the other outer surface of the lens barrel 100. The fifth driving unit 750 may be attached to the center of the other outer surface of the lens barrel 100.

In addition, the fifth driving unit 750 faces the first driving unit 710. The fifth driving unit 750 sandwiches the lens barrel 100 together with the first driving unit 710. That is, the fifth driving unit 750 faces the first driving unit 710 while interposing the lens barrel 100 therebetween.

The fifth driving unit 750 may include a magnetic material. The fifth driving unit 750 may be formed by using the magnetic material. The fifth driving unit 750 may include iron oxide, CoFe2O4 or ferrite. The fifth driving unit 750 may have a plate shape. The fifth driving unit 750 may have a rectangular plate shape.

The magnetization direction of the fifth driving unit 750 may be inclined with respect to the optical axis OA. In addition, the magnetization direction of the fifth driving unit 750 may be inclined with respect to the first direction. Further, the magnetization direction of the fifth driving unit 750 may be inclined with respect to the reference horizontal plane R. In detail, the magnetization direction of the fifth driving unit 750 may be set between the first direction and the image-side direction. That is, the magnetization direction of the fifth driving unit 750 may be located in a plane defined by the first direction and the image-side direction.

An angle θ3 between the magnetization direction of the fifth driving unit 750 and the reference horizontal plane R is in the range of about −20° to about −70°. In detail, the angle θ3 between the magnetization direction of the fifth driving unit 750 and the reference horizontal plane R is in the range of about −30° to about −50°.

The sixth driving unit 760 is fixed to the housing 400. In detail, the sixth driving unit 760 may be disposed at the other inner side of the housing 400. In addition, the sixth driving unit 760 may be disposed at the other outer surface of the housing 400. The sixth driving unit 760 may be disposed at the first sidewall 410.

The sixth driving unit 760 faces the fifth driving unit 750. In addition, the fifth and sixth driving units 750 and 760 are spaced apart from each other while facing each other. The fifth driving unit 750 may be parallel to the sixth driving unit 760. A distance d3 between the fifth and sixth driving units 750 and 760 is in the range of about 50 μm to about 1000 μm, in detail, about 100 μm to about 500 μm.

The sixth driving unit 760 may include a coil. That is, the sixth driving unit 760 may be prepared in the form of a coil. In this case, the coil of the sixth driving unit 760 is wound about an axis extending in the first direction.

The coil of the sixth driving unit 760 may be electrically connected to the circuit board 800. A portion of the sixth driving unit 760 may directly make contact with the circuit board 800.

In detail, the sixth driving unit 760 includes extension parts 761a and 761b. The extension parts 761a and 761b extend from both ends of the sixth driving unit 760, respectively. That is the extension parts 761a and 761b are drawn from the coil of the sixth driving unit 760. The extension parts 761a and 761b may be drawn from an outer portion of the coil of the sixth driving unit 760. Although the extension parts 761a and 761b are illustrated as to be drawn from the outer portion of the coil, the embodiment is not limited thereto. That is, the extension parts 761a and 761b may be drawn from an inner portion of the coil of the sixth driving unit 760. However, if the extension parts 761a and 761b are drawn from the inner portion of the coil of the sixth driving unit 760, the extension parts 761a and 761b may interfere with components so the drawing work is difficult.

End portions of the extension parts 761a and 761b may directly make contact with the circuit board 800. The extension parts 761a and 761b may extend from the sixth driving unit 760 to the top surface of the circuit board 800. Since end portions of the extension parts 761a and 761b directly make contact with the circuit board 800, the structure and the manufacturing process can be simplified. In addition, the defective rate can be reduced by reducing the number of soldering processes.

Although it has been described above that the fifth driving unit 750 includes the magnetic material, which is magnetized in the inclined direction, and the sixth driving unit 760 includes the coil, the embodiment is not limited thereto. For instance, the sixth driving unit 760 may include the magnetic material, which is magnetized in the inclined direction, and the fifth driving unit 750 may include the coil.

Attractive force or repulsive force may be generated between the fifth and sixth driving units 750 and 760. The sixth driving unit 760 may apply the attractive force or repulsive force to the fifth driving unit 750.

The sixth driving unit 760 may apply attractive force or repulsive force to the fifth driving unit 750 in a direction inclined with respect to the reference horizontal plane R. In this case, the sixth driving unit 760 may apply the magnetic force to the fifth driving unit 750 at an angle of about +20° to about +70° with respect to the reference horizontal plane R. In detail, the sixth driving unit 760 may apply the magnetic force to the fifth driving unit 750 at an angle of about +30° to about +50° with respect to the reference horizontal plane R.

In addition, the sixth driving unit 760 may apply the magnetic force to the fifth driving unit 750 in the first direction as well as the object-side direction. That is, the sixth driving unit 760 may apply the magnetic force to the fifth driving unit 750 in the lateral upward direction.

The seventh driving unit 770 is fixed to the lens barrel 100. In detail, the seventh driving unit 770 is fixed to the other outer portion of the lens barrel 100. In more detail, the seventh driving unit 770 is attached to the other outer surface of the lens barrel 100. The seventh driving unit 770 may be attached to the center of the other outer surface of the lens barrel 100.

In addition, the seventh driving unit 770 faces the third driving unit 730. The seventh driving unit 770 sandwiches the lens barrel 100 together with the third driving unit 730. That is, the seventh driving unit 770 faces the third driving unit 730 while interposing the lens barrel 100 therebetween.

The seventh driving unit 770 may include a magnetic material. The seventh driving unit 770 may be formed by using the magnetic material. The seventh driving unit 770 may include iron oxide, CoFe2O4 or ferrite. The seventh driving unit 770 may have a plate shape. The seventh driving unit 770 may have a rectangular plate shape.

The magnetization direction of the seventh driving unit 770 may be inclined with respect to the optical axis OA. In addition, the magnetization direction of the seventh driving unit 770 may be inclined with respect to the second direction. Further, the magnetization direction of the seventh driving unit 770 may be inclined with respect to the reference horizontal plane R. In detail, the magnetization direction of the seventh driving unit 770 may be set between the second direction and the object-side direction. That is, the magnetization direction of the seventh driving unit 770 may be located in a plane defined by the second direction and the object-side direction.

An angle θ4 between the magnetization direction of the seventh driving unit 770 and the reference horizontal plane R is in the range of about +20° to about +70°. In detail, the angle θ4 between the magnetization direction of the seventh driving unit 770 and the reference horizontal plane R is in the range of about +30° to about +50°.

The eighth driving unit 780 is fixed to the housing 400. In detail, the eighth driving unit 780 may be disposed at the other inner side of the housing 400. In addition, the eighth driving unit 780 may be disposed at the other outer surface of the housing 400. The eighth driving unit 780 may be disposed at the second sidewall 420.

The eighth driving unit 780 faces the seventh driving unit 770. In addition, the seventh and eighth driving units 770 and 780 are spaced apart from each other while facing each other. The seventh driving unit 770 may be parallel to the eighth driving unit 780. A distance d4 between the seventh and eighth driving units 770 and 780 is in the range of about 50 μm to about 1000 μm, in detail, about 100 μm to about 500 μm.

The eighth driving unit 780 may include a coil. That is, the eighth driving unit 780 may be prepared in the form of a coil. In this case, the coil of the eighth driving unit 780 is wound about an axis extending in the second direction.

The coil of the eighth driving unit 780 may be electrically connected to the circuit board 800. A portion of the eighth driving unit 780 may directly make contact with the circuit board 800.

In detail, the eighth driving unit 780 includes extension parts 781a and 781b. The extension parts 781a and 781b extend from both ends of the eighth driving unit 780, respectively. That is the extension parts 781a and 781b are drawn from the coil of the eighth driving unit 780. The extension parts 781a and 781b may be drawn from an outer portion of the coil of the eighth driving unit 780. Although the extension parts 781a and 781b are illustrated as to be drawn from the outer portion of the coil, the embodiment is not limited thereto. That is, the extension parts 781a and 781b may be drawn from an inner portion of the coil of the eighth driving unit 780. However, if the extension parts 781a and 781b are drawn from the inner portion of the coil of the eighth driving unit 780, the extension parts 781a and 781b may interfere with components so the drawing work is difficult.

End portions of the extension parts 781a and 781b may directly make contact with the circuit board 800. The extension parts 781a and 781b may extend from the eighth driving unit 780 to the top surface of the circuit board 800. Since end portions of the extension parts 781a and 781b directly make contact with the circuit board 800, the structure and the manufacturing process can be simplified. In addition, the defective rate can be reduced by reducing the number of soldering processes.

Although it has been described above that the seventh driving unit 770 includes the magnetic material, which is magnetized in the inclined direction, and the eighth driving unit 780 includes the coil, the embodiment is not limited thereto. For instance, the eighth driving unit 780 may include the magnetic material, which is magnetized in the inclined direction, and the seventh driving unit 770 may include the coil.

Attractive force or repulsive force may be generated between the seventh and eighth driving units 770 and 780. The eighth driving unit 780 may apply the attractive force or repulsive force to the seventh driving unit 770.

The eighth driving unit 780 may apply attractive force or repulsive force to the seventh driving unit 770 in a direction inclined with respect to the reference horizontal plane R. In this case, the eighth driving unit 780 may apply the magnetic force to the seventh driving unit 770 at an angle of about −20° to about −70° with respect to the reference horizontal plane R. In detail, the eighth driving unit 780 may apply the magnetic force to the seventh driving unit 770 at an angle of about −30° to about −50° with respect to the reference horizontal plane R.

In addition, the eighth driving unit 780 may apply the magnetic force to the seventh driving unit 770 in the second direction as well as the image-side direction. That is, the eighth driving unit 780 may apply the magnetic force to the seventh driving unit 770 in the lateral downward direction.

The elastic member 300 may have elasticity in the object-side direction, the image-side direction, the first direction and the second direction. That is, the elastic member 300 may have elastic modulus in the object-side direction, the image-side direction, the first direction and the second direction. The lens barrel 100 may move in the object-side direction, the image-side direction, the first direction and the second direction and return to its initial position due to the elastic member 300.

The camera module according to the embodiment may be operated as follows.

First, if the camera module according to the embodiment is shaken, a shake sensor senses the shake. At this time, the driving unit 710, 720 . . . 700N moves the lens barrel 100 to compensate for the shake under the control of the control unit.

In this case, the voltage applied to the second driving unit 720 and the sixth driving unit 760 is adjusted to compensate for the first directional component of the shake. In addition, the voltage applied to the fourth driving unit 740 and the eighth driving unit 780 is adjusted to compensate for the second directional component of the shake.

For instance, if the subject moves in the first direction due to the shake, the lens barrel 100 may be tilted in the moving direction of the subject by the first driving unit 710, the second driving unit 720, the fifth driving unit 750 and the sixth driving unit 760.

In addition, if the subject moves in the second direction due to the shake, the lens barrel 100 may be tilted in the moving direction of the subject by the third driving unit 730, the fourth driving unit 740, the seventh driving unit 770 and the eighth driving unit 780.

Further, the camera module according to the embodiment may automatically adjust the focus of the lens assembly 200. That is, the camera module according to the embodiment can increase the distance between the lens assembly 200 and the sensor unit 600 by applying repulsive force to the first driving unit 710, the second driving unit 720, the fifth driving unit 750 and the sixth driving unit 760.

In addition, the camera module according to the embodiment can reduce the distance between the lens assembly 200 and the sensor unit 600 by applying repulsive force to the third driving unit 730, the fourth driving unit 740, the seventh driving unit 770 and the eighth driving unit 780.

In this manner, the camera module according to the embodiment can perform the shake compensation and focus adjustment by inclining the magnetization direction using eight driving units 710 to 780.

As described above, the camera module according to the embodiment can compensate for the hand-shake by driving the lens barrel 100 relative to the housing 400. That is, the driving units 710 to 780 move the lens barrel 100 relative to the housing 400 to compensate for the hand-shake.

In particular, the camera module according to the embodiment applies the magnetic force in the direction inclined with respect to the reference horizontal plane R to move the lens barrel 100. Thus, the camera module according to the embodiment can move the lens barrel 100 in the 3-axis directions. Thus, the camera module according to the embodiment can compensate for the left-right shake and can adjust the focus.

Therefore, the camera module according to the embodiment may perform various functions with a smaller number of components and the size of the camera module can be reduced.

Figure 9:
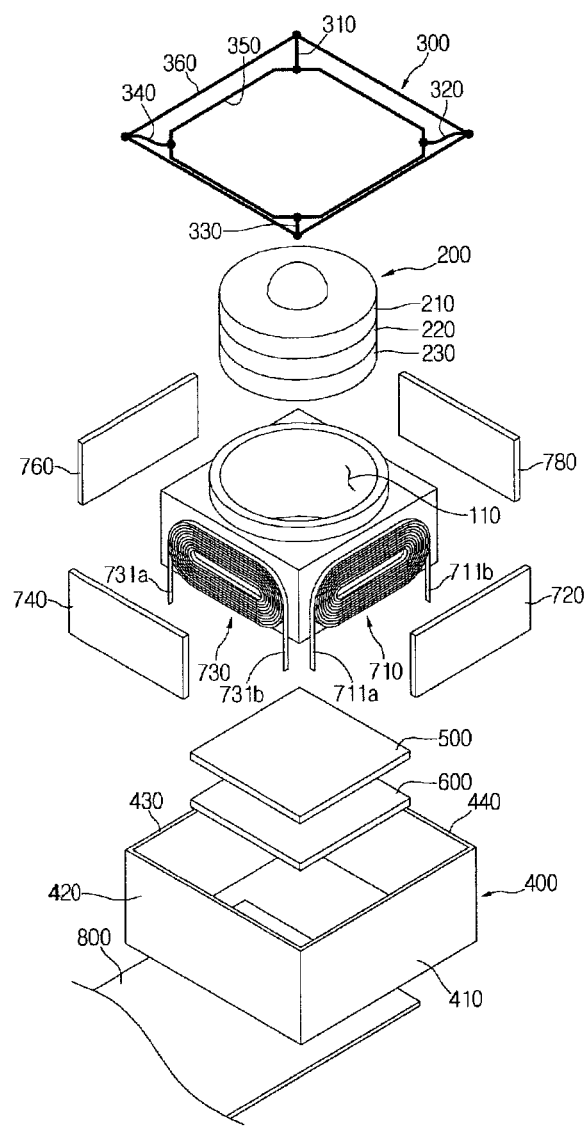
FIG. 9 is an exploded perspective view showing a camera module according to another embodiment.

Hereinafter, a camera module according to another embodiment will be described in detail with reference to FIG. 9. FIG. 9 is an exploded perspective view showing the camera module according to another embodiment.

Referring to FIG. 9, a first driving unit 710, a third driving unit 730, a fifth driving unit 750 and a seventh driving unit 770 are formed in the lens barrel 100 and include coils.

In addition, the first driving unit 710, the third driving unit 730, the fifth driving unit 750 and the seventh driving unit 770 include extension parts that directly make contact with the circuit board 800.

In detail, the first driving unit 710 includes extension parts 711*a* and 711*b*. The extension parts 711*a* and 711*b* extend from both ends of the first driving unit 710. That is, the extension parts 711*a* and 711*b* are drawn from the coil of the first driving unit 710. The extension parts 711*a* and 711*b* can be drawn from the outer portion of the coil of the first driving unit 710. Although the extension parts 711*a* and 711*b* are illustrated as to be drawn from the outer portion of the coil of the first driving unit 710, the embodiment is not limited thereto. According to another embodiment, the extension parts 711*a* and 711*b* may be drawn from the inner portion of the coil of the first driving unit 710.

End portions of the extension parts 711*a* and 711*b* may directly make contact with the circuit board 800. The extension parts 711*a* and 711*b* may extend from the first driving unit 710 to the top surface of the circuit board 800.

Similar to the first driving unit 710, the third driving unit 730, the fifth driving unit 750 and the seventh driving unit 770 may also have the extension parts, respectively.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A camera module comprising:
a housing including a first side surface and a second side surface;
a lens barrel provided between the first side surface of the housing and the second side surface of the housing;
a first driving unit disposed on a first side surface of the lens barrel and including a first magnet;
a second driving unit disposed on the first side surface of the housing and including a first coil facing the first magnet;
a third driving unit disposed on a second side surface of the lens barrel and including a second magnet;

a fourth driving unit disposed on the second side surface of the housing and including a second coil facing the second magnet; and a circuit board supporting the housing and electrically connected to the first coil and the second coil, wherein the second driving unit includes two extension parts that extend from the first coil and directly contact the circuit board, and wherein the fourth driving unit includes two extension parts that extend from the second coil and directly contact the circuit board, wherein the first driving unit and the second driving unit are overlapped with respect to each other in a horizontal direction that is perpendicular to a central axis of the lens barrel, and wherein the third driving unit and the fourth driving unit are overlapped with respect to each other in the horizontal direction that is perpendicular to the central axis of the lens barrel.

2. The camera module of claim 1, wherein the second driving unit is coupled to the housing.

3. The camera module of claim 1, wherein the second driving unit is disposed between the housing and the first driving unit.

4. The camera module of claim 1, wherein the two extension parts of the second driving unit directly and physically contact a top surface of the circuit board.

5. The camera module of claim 1, further comprising an image sensor mounted on a top surface of the circuit board.

6. The camera module of claim 1, further comprising an image sensor disposed between a bottom surface of the lens barrel and a top surface of the circuit board.

7. The camera module of claim 1, further comprising an elastic member connecting the lens barrel to the housing and supporting the lens barrel, wherein a first end of the elastic member is connected to a top surface of the lens barrel and a second end of the elastic member is connected to an inner surface of the housing.

8. The camera module of claim 7, wherein the second end of the elastic member is disposed on the second driving unit.

9. The camera module of claim 7, wherein the first driving unit and the second driving unit are disposed under the elastic member.

10. The camera module of claim 1, wherein the housing has a polygonal shape.

11. The camera module of claim 1, wherein the lens barrel has a polygonal shape.

12. The camera module of claim 1, wherein the first magnet includes a magnetic material magnetized in a direction inclined with respect to a central axis of the lens barrel.

13. The camera module of claim 12, wherein attractive force or repulsive force is applied between the first driving unit and the second driving unit in a direction inclined with respect to a horizontal plane perpendicular to the central axis of the lens barrel.

14. The camera module of claim 13, wherein an angle between the horizontal plane perpendicular to the central axis of the lens barrel and the direction of the attractive force or repulsive force is in a range of about 20 degrees to about 70 degrees.

15. The camera module of claim 1, wherein the first driving unit is disposed between the lens barrel and the second driving unit.

16. The camera module of claim 1, further comprising an IR cut-off filter disposed on an image sensor.

17. The camera module of claim 16, wherein the IR cut-off filter is surrounded by the housing.

18. The camera module of claim 1, further comprising an image sensor surrounded by the housing.

19. The camera module of claim 1, wherein the lens barrel, the first driving unit, the second driving unit, and an elastic member are surrounded by the housing.

20. An electronic device comprising the camera module of claim 1.

21. The camera module of claim 1, wherein the first magnet includes a magnetic material magnetized in a first direction inclined with respect to the central axis of the lens barrel, and wherein the second magnet includes a magnetic material magnetized in a second direction inclined with respect to the central axis of the lens barrel.

22. A camera module comprising:

a housing including a first side surface and a second side surface;

a lens barrel including a first surface and a second surface, the first surface facing the first side surface of the housing and the second surface facing the second side surface of the housing;

a first magnet disposed on the first surface of the lens barrel;

a first coil disposed on the first side surface of the housing and facing the first magnet; a second magnet disposed on the second surface of the lens barrel;

a second coil disposed on the second side surface of the housing and facing the second magnet;

a circuit board supporting the housing and electrically connected to the first coil and the second coil, wherein two extension parts extend from the first coil and directly contact the circuit board, and wherein two extension parts extend from the second coil and directly contact the circuit board, an elastic member including a first section and a second section, the first section connecting the lens barrel to the first side surface of the housing and the second section connecting the lens barrel to the second side surface of the housing, wherein the first section of the elastic member is vertically overlapped with the first magnet and the first coil, wherein the second section of the elastic member is vertically overlapped with the second magnet and the second coil, wherein the first coil is wound around a first axis perpendicular to a central axis of the lens barrel, and wherein the second coil is wound around the first axis perpendicular to the central axis of the lens barrel.

23. The camera module of claim 22, wherein the first magnet includes a magnetic material magnetized in a first direction inclined with respect to the central axis of the lens barrel, and wherein the second magnet includes a magnetic material magnetized in a second direction inclined with respect to the central axis of the lens barrel.

* * * * *